United States Patent [19]

West

[11] Patent Number: 4,484,638
[45] Date of Patent: Nov. 27, 1984

[54] LIQUID INERTIA TOOL

[76] Inventor: Joe E. West, Rte. 1, Box 158, Meridian, Tex. 76665

[21] Appl. No.: 832,533

[22] Filed: Sep. 12, 1977

Related U.S. Application Data

[63] Continuation-in-part of Ser. No. 714,375, Aug. 16, 1976, abandoned.

[51] Int. Cl.³ .......................... B25D 9/00; B25D 11/00
[52] U.S. Cl. ...................................... 173/90; 173/116;
173/DIG. 4; 83/639; 72/453.01; 405/232
[58] Field of Search ........... 173/90, 102, 114, DIG. 1,
173/116, DIG. 4; 91/318, 49, 50, 47; 92/131;
417/151; 83/639; 72/54–57, 453.01; 175/92;
137/119; 405/232

[56] References Cited

U.S. PATENT DOCUMENTS

| | | | |
|---|---|---|---|
| 842,049 | 1/1907 | Wolski | 173/73 |
| 1,112,498 | 10/1914 | Vanes | 173/73 |
| 2,325,264 | 7/1943 | Merten | 175/103 |
| 3,150,488 | 9/1964 | Haley | 173/DIG. 4 |
| 3,164,214 | 1/1965 | Oelke | 173/73 |
| 3,616,868 | 11/1971 | Bassinger | 173/73 |
| 3,625,820 | 12/1971 | Gluntz et al. | 417/151 X |
| 3,970,152 | 7/1976 | Harris et al. | 91/56 |
| 4,044,844 | 8/1977 | Harris et al. | 91/50 |

Primary Examiner—Lawrence J. Staab
Attorney, Agent, or Firm—Thomas L. Cantrell; Stanley R. Moore; Warren B. Kice

[57] ABSTRACT

Disclosed is a liquid inertia tool in which the kinetic energy of flowing liquid is converted to useful work by decelerating the liquid flow and directing the inertia force in the water against a movable element in the liquid flowcontaining structure which in turn moves against a work piece. Flow deceleration is achieved by an orifice-effect valve. The valve is reset for flow resumption or acceleration by automatically or selectively applying hydraulic pressure to a reset mechanism. Use of the inertia tool in pile driving and punch press applications is disclosed.

39 Claims, 10 Drawing Figures

LIQUID INERTIA TOOL

This application is a continuation-in-part of my co-pending U.S. patent application Ser. No. 714,375, filed Aug. 16, 1976, now abandoned, and entitled "Liquid Inertia Tool".

BACKGROUND OF THE INVENTION

Devices for exploiting the forces developed by the inertia of flowing liquid which has been decelerated (the "water hammer" effect) have been proposed in the past. The most common application of such devices has been in well drilling tools.

Typically, prior devices have involved liquid driven hammers which impact against anvils, which in turn impact against the work piece. That is to say, the water hammer force has been applied to the work indirectly. The resetting of the flow decelerating valve has usually been accomplished by reliance on springs calculated to act during the period of rarefaction or reduced pressure in the liquid which follows promptly after the inertia surge. See U.S. Pat. Nos. 699,273; 842,049 and 1,112,498. Spring resetting of the flow interrupting valve has several disadvantages as a mode of operation. The period of rarefaction in the liquid during which the valve must be opened is quite short in duration, and it is accordingly difficult to assure adequate opening.

In such devices a lack of operating flexibility is inherent, because once a valve spring of a given strength is selected and installed, the maximum and minimum operating pressures of the unit are fixed.

For these and similar reasons, there has been a sparcity of attempts to apply the liquid inertia impact principle to other areas where an abrupt application of force is required, such as pile driving, both on land and under sea, punch pressing, baling presses, seismic noise-makers, and the like.

SUMMARY OF THE INVENTION

In accordance with the present invention, an improved liquid inertia tool is provided which is readily adaptable to a wide variety of applications. The actuating mechanism of the tool is constructed so that it places no limitation on the operating pressure of the unit.

The impact tool of the invention may be constructed to utilize working liquid carried in a closed loop, or working fluid which makes only a single pass through the unit.

In accordance with the present invention an improved liquid inertia tool is provided in which the resetting of the flow decelerating valve is accomplished positively by means of an hydraulic valve lifting means. The valve operating and resetting mechanism may be arranged to operate automatically at a selected cycle rate, which may be rapid or relatively slow, or it may be arranged to be reset only upon actuation by an externally supplied manual or automatic signal. The valve closes when the liquid passing through it reaches a reselected velocity. The time required for the liquid to reach this velocity depends on the operating pressure. There is a theoretical maximum velocity for each pressure. For example, at fifty pounds per square inch, the maximum velocity is about eighty five feet per second, and at eighty pounds per square inch, it is about one hundred ten feet per second. The cycle rate may be altered by modifying the relative dimensions of the valve closure mechanism or the operating pressure.

More particularly, in accordance with the invention, liquid is flowed through a ram tube in the direction of the desired application of force. Slidably mounted in the end of the ram tube is a piston, which is the element through which the liquid inertia is applied to a work piece such as a piling (in the case of a pile driver) or a punch die (in the case of a punch press).

Upstream in the ram tube from the piston is a flow diverting passage, in the entrance of which is a flow decelerating valve. When the valve is open, liquid flowing through the ram tube passes through it and into and through the flow diverting passage. Only a static "leg" of liquid is interposed between the face of the piston and the valve in this condition of operation.

When the valve is abruptly closed, the inertia in the moving liquid is applied to the face of the piston, which slides in the ram tube and against the work piece until the inertia is absorbed by the work piece and the liquid flow is brought to a halt, or until application of force to the piston is terminated without fully stopping the flow of liquid.

The flow decelerating valve is of the stem type, and, in one preferred embodiment, carries on its stem an apertured orifice plate, which is positioned in the path of liquid flow. As the flow of liquid builds in velocity while the flow decelerating valve is open, the pressure drop across the orifice plate increases. Eventually the pressure drop across the plate attains a value sufficient to overcome the force (discussed below) which is holding the valve open, and the valve closes, bringing about the water hammer effect outlined above.

The flow decelerating valve is held open by, and is reopened by, an hydraulic valve lifter mechanism. This mechanism includes a piston connected to the valve stem, and a static hydraulic pressure line adapted to apply a force to the face of the piston which is normally greater than the force applied by the liquid in the tube to the opposite face of the valve. This imbalance of forces tends to hold the valve open, except when the force resulting from the pressure drop across the orifice plate overcomes it. The pressure drop force closes the valve, and the pressure resulting from the inertia in the decelerating liquid hold it closed for a period. When inertia of the decelerating liquid is spent doing work, the pressure in the tube holding the valve closed is substantially equal to the static hydraulic pressure line pressure acting on the valve lifter, but, as is explained below, there is a difference in the areas to which these pressures are applied, that in the lifter mechanism being the greater. The valve therefore reopens, and the cycle recommences.

In accordance with the invention the piston of the valve lifter is preferably resiliently connected to the valve, and means are provided for permitting escape of a small portion of the liquid in the static pressure line upon closure of the valve. In this manner rapid and positive valve closure is provided for.

When the equipment is set up for automatic cycling operation, the source of the liquid for hydraulically lifting the valve and maintaining it in open position for desired length of time is a side loop of the working liquid stream. Thus the pressure in the hydraulic lifter system is substantially the same as that in the tube at the same point along its length; the pressure in the static line being slightly higher than that in the tube, because of the pressure drop inherent in the flowing liquid in the tube.

When the equipment is set up for selective closure of the valve upon an outside signal, either manual or automatic, the source of the hydraulic valve lifting liquid is also through a side loop of the working fluid stream, but a control valve is interposed in the side loop for selectively applying line pressure, which tends to hold the valve open, or atmospheric pressure, which tends to permit rapid closure of the flow interrupter valve at a selected time.

In accordance with another aspect of the invention, the relative areas of the ram tube and the driving piston are selected to maximize or minimize, as may be desired, the participation of the mass of the tool in the impact upon the work place. If the ram tube and the driving piston have equal areas, the initial or maximum velocity of the piston is substantially equal to the terminal velocity of the flowing liquid, and there is little or no reactive force component tending to lift the tool off of the work piece. If the ram tube area is smaller than the driving piston area, the initial velocity of the piston is a proportionately smaller fraction of the terminal velocity of the liquid, and there is a resultant reactive force on the tool tending to lift away from the work piece. If the tool weight is arranged to at least equal the weight of the liquid column, this reactive force is effectively countered and redirected toward the work piece, and the effective ram weight becomes the sum of the weight of the tool and the weight of the liquid column, even though only the latter has been in motion.

In accordance with another aspect of the invention, underwater tool embodiments of the invention such as pile drivers may be equipped with venturi jet pumps, which pumps are fed from low volume high pressure pumps conveniently located on the surface.

A further aspect of the invention includes the provision of an accumulator, preferably a dual piston accumulator, on the tool just upstream of the flow decelerating valve, which provides the capability of limiting the maximum force applied by the tool to a selected value, which may be varied from one operation to another.

The liquid inertia device of the invention, when combined with suitable work tools and mounting or supporting structures, can be advantageously employed in a very wide range of applications. It can be used for pile and casing driving, both on-shore and underwater, and in vertical or non-vertical driving situations. For example, it can be used to drive casing horizontally under a highway to form a culvert. The device can be employed in impact tools, especially for underwater cutting, tightening, driving or punching, thus facilitating both underwater construction and demolition operations.

The device may also effectively be employed as a component of seismic or sonar sound generators, and in other applications requiring a source of high intensity vibrations. It is particularly capable of creating high intensity vibrations with a higher velocity in one direction than others, as is desired in a seismic horizontal shear wave generator.

In the metal working field, the liquid inertia device of the invention may be employed for punching, cutting, forging, and impact forming of metal in a manner similar to explosion forming without the attendant hazards and inconveniences. Punch presses and forges may be arranged both vertically and horizontally, and may be much lighter in construction than comparable pieces of conventional equipment.

The devices may be employed in drilling tools for mining which are quieter and less dusty in operation, as well as safer and more efficient than pneumatic tools or explosives, both for mine face work and for down-drilling of shafts.

Numerous advantages flow from the use of the device in the pile driving field, particularly for underwater pile driving, in comparison with conventional pile drivers. Pile drivers employing the device can operate any angle. They are quieter and utilize energy more efficiently. Because there is no mechanical gap between the tool and the piling, danger of damage to the piling is eliminated and no pile cap is needed. In under water drivers the unit will operate at any depth without loss of power, and is easier to operate from a remote power source. In addition, pile drivers equipped with the device can be quickly and readily adjusted to vary the mass impact as desired. The scale of the pile drivers of the invention can vary from small fence post drivers, through tent stake and antenna guy wire stake drivers, on up to vary large units for oil well platform pilings.

From the foregoing it can be seen that a major object of the present invention is the provision of a liquid inertia tool having a flow decelerating valve of improved design to provide assurance of rapid and positive closure of the valve and positive resetting thereof.

Another object of the invention is the provision of an inertia impact tool whose actuating mechanism places substantially no limitation on the operating pressure of the device.

A further object of the invention is to provide an inertia impact tool adapted to employ a closed loop of working liquid.

It is an important object of the invention to provide an inertia impact tool adaptable for use in a wide variety of applications, including pile driving, punch pressing, metal forging and the like.

Another object of the invention is to provide a liquid inertia tool especially adapted for underwater use.

A still further object of the invention is the provision of a liquid inertia tool in which the maximum applied force may be selectively varied without substantial energy wastage.

The manner in which these objects, together with other objects and purposes of the invention are accomplished can best be understood by a consideration of the detailed description which follows, together with the accompanying drawings.

DESCRIPTION OF THE PREFERRED EMBODIMENT

Figures 1, 2, 3, 4, 5:
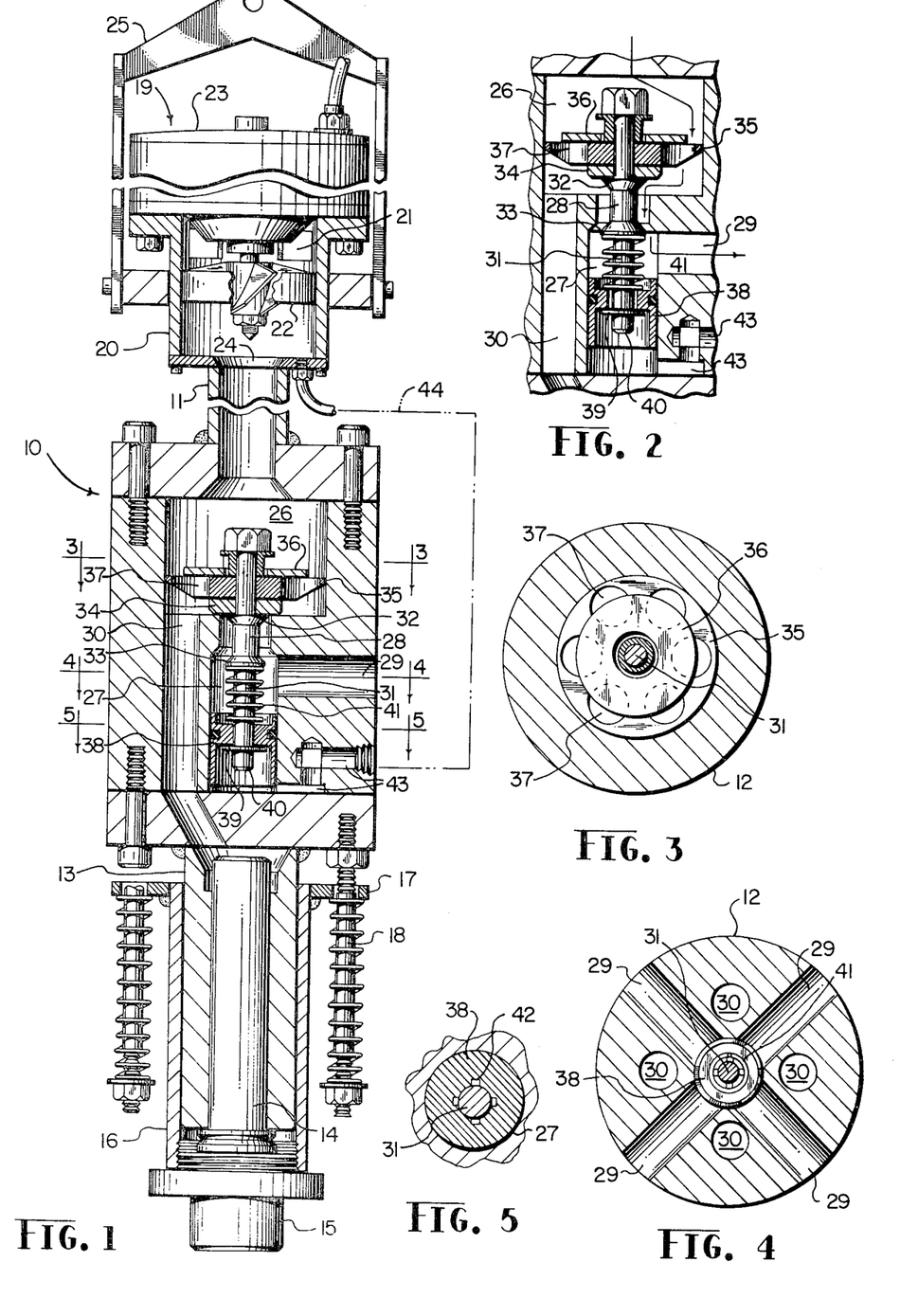
FIG. 1 is a sectional elevational view of a preferred embodiment of the invention, as applied to an underwater pile driving device.
FIG. 2 is a fragmentary sectional elevational view of a portion of the equipment shown in FIG. 1, illustrating the flow decelerating valve of the invention in open position.
FIG. 3 is a horizontal sectional view taken along the line 3—3 of FIG. 1, illustrating the flow decelerating valve orifice plate.
FIG. 4 is a horizontal sectional view taken along the line 4—4 of FIG. 1, illustrating the flow diverter passages of the apparatus.
FIG. 5 is a fragmentary horizontal cross-sectional view taken on the line 5—5 of FIG. 1, illustrating the valve lifter piston, and the hydraulic liquid escape means of the piston.

Attention is first directed to FIGS. 1 through 5, which illustrate a preferred embodiment of the invention as applied to an underwater pile driving application. In FIG. 1, the inertia tool of the invention is designated generally as 10. Since the tool is designed for use as a pile driver, the device is shown as vertically oriented with the desired direction of application of force downward, and the direction of flow of liquid through the tool is generally from top to bottom. It should be understood however that the pile driver may be operated at an angle. The tool 10 includes a liquid flow tube 11 of selected length, and a valve housing 12 which is functionally a lower extension of tube 11. Mounted to the bottom of valve housing 12 is cylinder 13 in which piston 14 is slidably mounted. Mounted at the bottom of piston 14 for movement therewith is pile driving hammer 15 which, unlike conventional pile driving hammers, remains in constant contact with the pile. Surrounding cylinder 13, and mounted for movement with hammer 15, is a spring return sleeve 16. Sleeve 16 also serves to maintain hammer 15 and the remainder of the tool in proper alignment, and lined up with the work. At the upper end of sleeve 16 is a flange 17 apertured to admit passage of a circumferentially spaced series of springloaded rods 18 which are threaded at their upper ends into valve housing 12. Upon downward movement of piston 14 in cylinder 13, flange 17 moves downward along rods 18 and compresses the springs thereon. When the forces which moved piston 14 downward have been dissipated, the energy stored in the springs on rods 18 together with the weight of the tool pulls the tool downwardly on the piston 14 to effectively retract it to the position shown in FIG. 1.

At the upper end of flow tube 11, there is mounted an impeller pump designated generally as 19, including an impeller housing 20 having liquid inlets 21, and pump impeller 22 driven by pump motor 23. An outlet 24 in housing 20 provides liquid communication with tube 11. When the unit of FIG. 1 is submerged, sea water flows inwardly into housing 20 through inlets 22.

The underwater pile driver 10 is suspended in the water over the piling to be driven by means of hanging bracket 25, to which a cable leading to a barge or platform may be attached. Other suitable tool positioning equipment may be provided in place of bracket 25.

Valve housing 12 is provided with several bores which divide the downflow of liquid through the housing into two alternate paths, one of which is followed when the liquid is building up velocity (and inertia), and the other of which is followed when the liquid is applying force to the top end of piston 14. The upper end of housing 12 is provided with a large central bore 26. At the bottom of bore 26 is central liquid diverter bore 27 in which is mounted the flow decelerating valve assemby 28, discussed in more detail hereinbelow. A series of radial bores 29 intercept bore 27 about midway of its length and complete the path of diverted liquid flow. When the unit of FIG. 1 is submerged over a piling to be driven, water passing through radial bores 29 is expelled into the sea.

Also provided are vertical bores 30 which run between large bore 26 and the top face of piston 14.

The valve assembly 28 includes a stem 31 having shoulders 32 and 33 formed thereon. Fitted against shoulder 32 is the valve itself, 34, and it can be seen from FIG. 1 that valve 34 seats against the bottom of bore 26. Mounted above the valve 34 is an apertured plate 35 which is also carried on stem 31. Resting on apertured plate 35 is another plate 36. As can best be seen by a consideration of FIG. 3, plate 36 partially overlies the apertures 37 in plate 35. By simply changing the size of plate 36, one can effectively change the size of the orifice which the apertures 37, collectively, comprise. By changing the size of the orifice, one changes the pressure drop conditions across it at any given liquid flow rate. A change in the pressure drop condition or characteristic of the orifice will change the flow rate at which the pressure differential across the orifice plate is sufficient to cause closure of valve 34 by overcoming the forces tending to hold it open.

It should be noted that plate 36 "floats" on valve stem 31 so that it moves upwardly in unison with stem 31 and apertured plate 35, but need not move downwardly in unison with them. Plate 36 thus does not hinder rapid downward closing movement of the valve 34 by imposing an unwanted and unnecessary drag on such movement.

A hydraulically actuated piston 38 is mounted on the lower end of valve stem 31 by means of washer 39 and bolt 40. A spring 41 working between stem shoulder 33 and the top faces of piston 38 tends to urge the piston 38 against washer 39. As can best be seen in FIG. 5, piston 38 is provided with a series of relief passages 42 communicating between its lower face and its upper face.

Bores 43 in housing 12 communicate with the lower end of bore 27, below the lower face of piston 38. Bores 43 form part of a side loop (indicated in FIG. 1 by dotted line 44) which is connected to impeller housing 20 on the downstream side of impeller 22. In this manner, liquid under pressure works against the lower face of piston 38 and the lower face of washer 39.

With the foregoing description of the parts of the device of FIGS. 1 through 5 in hand, its mode of operation can now be outlined. With the unit 10 submerged over a piling to be driven, sea water enters the unit through inlets 21 and is pumped downwardly through tube 11 and bore 21 by pump 19. With valve 34 open, as is illustrated in FIG. 2, water flows past orifice plate 35-36, through the valve bore 27, and out of the unit and into the surrounding sea through bores 29, all as shown by a series of arrows in FIG. 2. The static hydraulic pressure applied to the lower face of piston 38 tends to hold valve 34 away from its seat and in the position shown in FIG. 2. As the velocity of water flow builds up, the pressure drop across orifice plate 35-36 increases. At a predetermined liquid velocity this pressure drop reaches a value so that the downward force exerted on valve 34 by the pressure drop exceeds the force applied to the bottom face of piston 38 and the valve 34 thereupon closes against its seat.

With valve 34 closed, water can no longer escape from the unit through bores 27 and 29. It therefore decelerates toward, and under some conditions to, complete stoppage. The inertia of the decelerating water is directed, through bores 30, against the upper face of piston 14. Piston 14 slides downwardly within cylinder 13 against the resistance offered by the piling against which hammer 15 is bearing. The piling moves downwardly under this force until the force has been dissipated by friction of the piling against the material through which it is being driven.

At this point, the weight of the tool, and the energy in the now compressed springs on rods 18, pulls the tool downwardly on piston 14, thus relatively retracting the piston back into cylinder 13.

The closure movement of valve 34 is very abrupt, and it and the stem 31 move downwardly with great rapidity. Piston 38 tends to remain in the up position shown in FIG. 2 as valve 34 and stem 31 move downwardly because the water beneath it is non-compressible and cannot be displaced rapidly enough to permit extremely rapid valve closure. Piston 38 thus compresses the spring 41 which works between the stem and the piston. In this manner, a small amount of the liquid on the lower face of piston 38 is allowed to squirt through ports 42 (see FIG. 5) to the upper side of piston 38. Spring 41 then extends to bring piston 38 to its downward position as shown in FIG. 1. All of this occurs very shortly after closure of valve 34. It should be noted that spring 44 is strong enough to overcome the force exerted on the underside of piston 38 through static line 44, so that except for the momentary opening just described, relief ports 42 are normally closed.

With a downward stroke of piston 14 completed, and the flow through the unit still at a standstill or at least materially decelerated, the static pressure on the bottom face of piston 38 applies a greater upward force to the piston than the downward force applied by the static column of water above valve 34, owing to the difference in areas between the face of piston 38 and the area of valve 34 even though the two pressures are substantially the same. This greater upward force moves the valve 34 off its seat, that is, from the position shown in FIG. 1 to the position shown in FIG. 2. Liquid flow then recommences and the cycle just described repeats itself. Retraction of the piston 14 is completed before the liquid velocity build-up is completed. The cycling rate may vary widely, but typically will be in the range of 20 cycles per minute.

Figure 10:
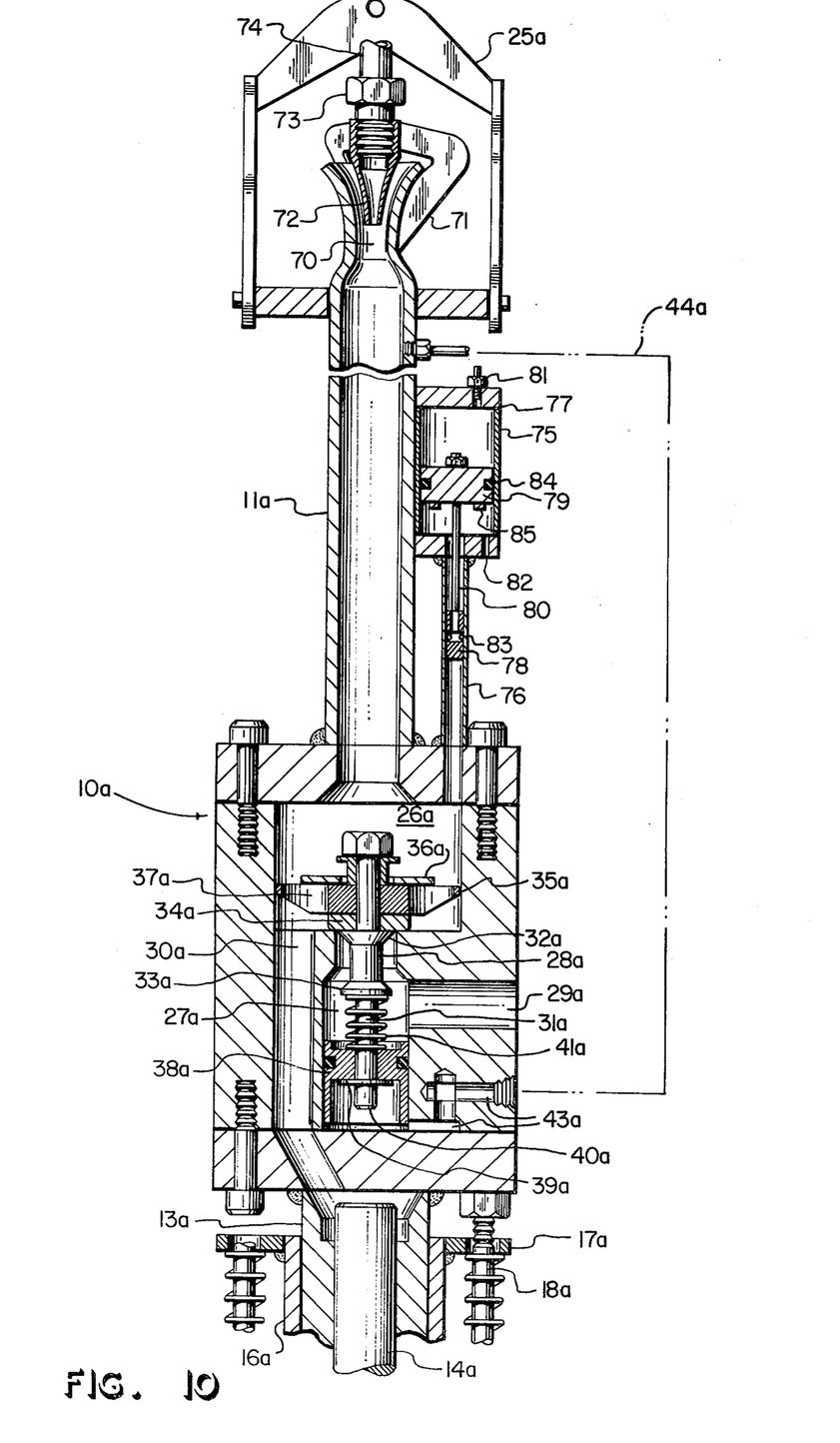
FIG. 10 is a sectional elevational view of another preferred embodiment of the invention, as applied to an underwater pile driving device.

In FIG. 10 a modified form of underwater pile driver is shown. In many respects it is identical to, or substantially identical to, the underwater pile driver of FIGS. 1–5, and parts which are identical or substantially identical are given the same reference characters (with the subscript "a" added) as are employed in FIGS. 1–5. Furthermore, reference is made to the discussion above of those FIGS. for an understanding of the structure and operation of such parts.

The apparatus of FIG. 10 differs from that of FIG. 15 in several respects. At its upper end, flow tube 11a is not directly connected to an impeller pump housing and an adjacent impeller pump. Instead, the upper end of flow tube 11a is formed into an upwardly open venturi throat 70. A spider structure 71 mounted on the end of tube 11a holds a tapered nozzle 72 substantially in the center of the inlet (upper) side of the venturi throat. The throat and nozzle together comprise a jet pump. With the unit submerged, high pressure liquid flow through nozzle 72 will induct additional water from the surrounding sea into and through the venturi, and accelerate it downwardly in tube 11a. Nozzle 72 is connected by fitting 73 to liquid supply hose 74.

This pump arrangement in an underwater pile driver has several advantages. The jet pump may be supplied with high pressure liquid from a low volume, high pressure pump located remotely from the balance of the pile driver, most conveniently on the surface of the water. In this way, the special constructional features necessary to make the pump submersible are not needed. This leads to cost savings and an increase in reliability. In addition, other factors being more or less equal, a low volume high pressure pump is less expensive than a high volume moderate pressure pump.

It should also be noted that the jet pump is free of cavitation problems and dangers when the column of water in tube 11a is decelerated or halted in accordance with the invention, and that the low volume high pressure feed pump is not exposed to cavitation conditions.

The jet pump arrangement also eliminates any pumporiginated tendency for the pile driver as a whole to rotate about its long (usually vertical) axis, since the jet pump exerts substantially no torque on the unit. This simplifies the problem of maintaining the pile driver in proper position with respect to the pile.

The pile driver of FIG. 10 also differs from that of FIG. 1 in that force limiting means in the form of accumulator or absorber 75 are provided. Accumulator 75 comprises cylinder 76, in communication with bore 26a above or upstream of valve assembly 28a, and closed cylinder 77, which is desirably coaxial with cylinder 76. Cylinder 77 is preferably larger in diameter than cylinder 76. Pistons 78 and 79 are mounted for reciprocation in cylinders 76 and 77 respectively. Both pistons are mounted on rod 80 so that they reciprocate together. Cylinder 77 is equipped with a gas charging valve 81 on the end thereof away from cylinder 76, and with a small vent 82 on the end thereof adjacent cylinder 76. Pistons 78 and 79 are provided with sealing means such as O-rings 83, 84, and piston 79 has bottoming stops mounted thereon.

Any given piling has a more or less definite maximum force absorbing capacity. An applied force in excess of this maximum will not act to propel the pile, but will instead damage it.

A pile driver of the type shown in FIG. 10 will, of course, have its liquid decelerating means and its mass designed and proportioned to deliver a desired maximum force. This force will inevitably exceed the force absorbing capacity of some of the piles with which the driver will be employed. Accumulator 75 provides the capability of limiting the maximum force applied to the pile without, however, wasting the energy derived from the moving water.

In operation, the compartment of accumulator 75 located in cylinder 77 above piston 79 is charged with gas, preferably nitrogen, through valve 81 to a pressure selected in view of the desired maximum applied force for a particular pile driving operation. This force is selected on the basis of the factors outlined above.

When the unit is at rest, the pressurization of cylinder 77 will move pistons 79 and 78 to their downmost positions. The lower face of piston 78 is exposed to pressure not far different from the pressure applied to driving piston 14a, and for purposes of discussion these pressures may be regarded as equal. When the unit is at rest, and when the water in tube 11a is being accelerated, this pressure is not sufficient to move pistons 78 and 79 upwardly against the pressurized gas in cylinder 77.

When valve assembly 28a closes in the manner explained above, the pressure on the underside of piston 78 rises as the water in tube 11a decelerates, and at some point during the deceleration reaches a valve corresponding (through multiplication by the area of driving piston 14a and addition of the mass of the unit) to the maximum desired applied force on the pile. When the pressure on the underside of piston 78 reaches this valve, the force on pistons 78 and 79 becomes unbalanced in the upward direction, and they begin to move upwardly in their cylinders. The gas above piston 79 is thus further compressed. By this process, the energy derived from the decelerating water is diverted from being expended in applying an increased force on the pile, and is temporarily stored in the pressurized gas above piston 79.

Eventually, in the course of a pile driving stroke, the pressure on the underside of piston 78 stops rising and starts to fall. At this point, the force on pistons 78 and 79 becomes unbalanced in the downward direction, and they begin to move downwardly in their cylinders. In this manner the fall-off in pressure in the water is slowed, and the energy stored in the gas is delivered into the water to be expended in applying additional driving force to the pile. This action ceases when piston 79 bottoms in its cylinder.

The result thus obtained by the user of accumulator 75 is to blunt the peak of the force-time curve for a pile driving stroke, holding the maximum applied force to a value less than or equal to the desired maximum, and lengthening the curve in the time dimension.

The accumulator 75 in the embodiment of FIG. 10 may be employed in inertia tools having features shown and discussed in connection with other embodiments.

Figures 6, 7, 8, 9:
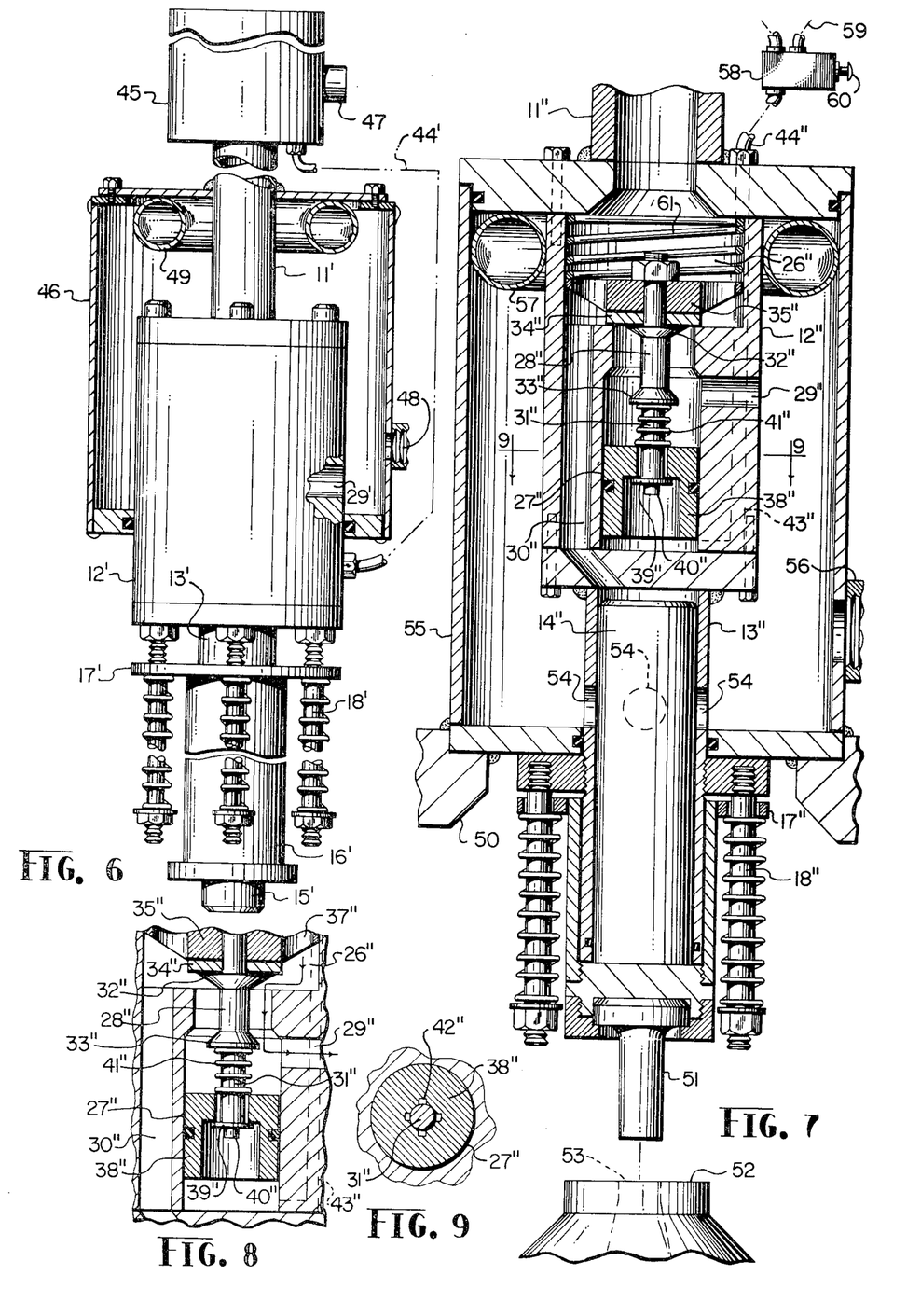
FIG. 6 is an elevational view, partly in section, of another embodiment of the invention as applied to a pile driver for use on land.
FIG. 7 is a sectional elevational view of still another embodiment of the invention as applied to a punch press.
FIG. 8 is a fragmentary sectional elevational view of a portion of the equipment shown in FIG. 7, illustrating the flow decelerating valve of the invention in its open position.
FIG. 9 is a fragmentary horizontal sectional view taken on the line 9—9 of FIG. 7 illustrating the hydraulic valve lifter piston and the hydraulic liquid escape passages provided therein.

Attention is now directed to FIG. 6, which illustrates the invention as applied to a pile driver designed for operation on land. Since many of the parts of the unit of FIG. 6 are the same as those in the unit of FIG. 1, the same reference characters are applied, with primes added.

The unit of FIG. 6 has a liquid flow tube 11', at the bottom of which is mounted valve housing 12' and cylinder 13'. The equipment mounted internally of housing 12' is identical with that of FIG. 1, to which reference is made, and it has the same mode of operation. Likewise, the piston and piston return mechanism associated with cylinder 13' are the same in structure and operation as those shown in FIG. 1.

Because the unit of FIG. 6 is designed for land operation, the pump need not be integral with it, and may be conveniently located elsewhere.

By the same token, it is desirable in a land-based unit to employ a closed loop for the working liquid, and the unit FIG. 6 is equipped with means for recycling the working liquid. These include accumulator or surge tank 45, positioned downstream from the pump (not shown), but upstream from valve housing 12', and accumulator or surge tank 46, positioned downstream from valve housing 12' but upstream of the pump. A body of gas is trapped in accumulator 45 above inlet 47 thereof.

Accumulator 46 is in the form of a tank fitting concentrically about the upper portion of valve housing 12' and the lower end of tube 11'. It receives liquid discharged through bores 29' of valve housing 12', and liquid flows out of it through outlet 48 to the pump (not shown). If desired, in addition to accumulators 45 and 46, the liquid loop may have a conventional reservoir (not shown) into which accumulator 46 discharges and out of which the pump draws. In the surge space of accumulator 46 is a gas-filled doughnut 49, which compresses and expands in response to changes in the volume of liquid in the accumulator.

The operation of the unit of FIG. 6 is substantially the same as that of FIG. 1, except that the working liquid is recycled.

Attention is now directed to FIGS. 7 through 9 which illustrate an alternate embodiment of the invention, as applied to a punch press environment. Many of the parts in the embodiment of FIGS. 7 through 9 are substantially the same as parts in the embodiments FIGS. 1 through 5, and for this reason they are assigned corresponding reference characters (with double primes added) in FIGS. 7 through 9. Furthermore, inasmuch as the mode of operation of the common components is much the same, and involves the same principles, reference is made to the description of the earlier embodiment for a general outline of the mode of operation of the embodiment of FIGS. 7 through 9. Accordingly, the present discussion will concentrate on the differences between the two embodiments.

In FIG. 7, the uppermost portion of the unit is omitted. However, by referring back to FIG. 6, one can see that it comprises an accumulator 45 and an inlet from the pressure supply pump.

The unit of FIG. 7 is mounted on a suitable frame 50.

At the lower end of the unit (see FIG. 7) a die punch 51 is connected to the bottom of piston 14", and is positioned over anvil 52 which is provided with female die opening 53. In operation, the work to be processed, typically sheet metal, is placed on anvil 52, and punch die 51 is driven against it, thereby separating a portion of the sheet metal and driving it into and through the female die opening 53.

In a punch press, as contrasted with a pile driver, it is desired that a punch make a stroke of predetermined standard length, i.e., enough to drive the punch through the work piece and into the die opening of the anvil, but not so much as to impact the shoulder of the punch against the work. Limitation of the length of stroke of piston 14" is provided in accordance with the invention by exhaust openings or lands 54 positioned at a selected point along the length of cylinder 13". After piston 41" has been driven downwardly by the inertia force of the working liquid far enough to uncover exhaust openings 54, it stops, because the liquid escapes through the openings. Thus, piston 14", in conjunction with exhaust openings 54, acts as its own slide valve for limiting the length of its stroke.

In accordance with the invention, the unit of FIG. 7 is provided with a surge chamber 55 which surrounds valve housing 12". The surge chamber 55 is located downstream in the unit from the source of pressure on the liquid, i.e., a pump. Surge chamber 55 receives flowing liquid through both diverter bores 29" and escape openings 54. Surge chamber 55 is provided with an outlet 56 leading to a working liquid reservoir (not shown) from which a line leads to the pump inlet. Surge chamber 55 is provided with a surge doughnut 57, filled with a suitable gas such as air, and formed of a resilient material, such as rubber. In this way, provision is made for surging of the liquid, without encountering problems such as liquid entrainment in the gas of the surge chamber or dissolution of the gas of the surge chamber in the liquid. Typically, the working liquid in a unit such as that shown in FIG. 7, will be a noncorrosive and nonrusting liquid such as ethylene glycol.

Bore 43″ and side loop 44″ provide a path for supply of hydraulic pressure for valve lifting purposes at the lower end of bore 27″. Control loop 44″ is connected to the downstream side of the pump, for example, at accumulator 45 (See FIG. 6). Loop 44″ has a control valve 58 inserted in it. Control valve 58 has two operative positions. In one, liquid pressure is communicated from accumulator 45″ through loop 44″ and bores 43″ to the lower face of piston 38″. In the other, this path of pressure communication is blocked by the valve and the lower portion of bore 27″ is placed on communication with the working liquid reservoir (not shown) through bore 43, a portion of loop 44″ and vent line 59. Control valve 58 may be manually actuated, as is indicated by actuating button 60, or, as workers skilled in the art will appreciate, valve 58 may be automatically actuated in coordination with feed equipment which automatically moves work pieces across anvil 52.

The valve closing assembly of the embodiment of FIG. 7 differs from that of the embodiment of FIG. 1 in that apertured plate 35″ is not overlaid by a plate such as 36 (see FIG. 3) partially closing apertures 37″. In addition, spring 61 is mounted to work between the top of housing 12, and the upper surface of apertured plate 35″. Spring 61 thus biases the valve assembly 28″ toward the closed position. The speed of response of valve 34″ to the removal of valve opening pressure from the lower face of piston 38″ may be adjusted by varying the strength of bias of spring 61.

A cycle of operation of the unit of FIGS. 7-9 begins with valve 34″ held in the open position shown in FIG. 8 by the application of hydraulic pressure through line 44″ and bore 43″ to the lower face of piston 38″ working in bore 27″. The pump drives working liquid downwardly through tube 11″, bore 26″, through the valve, and out diverter bore 29″ into surge chamber 55 from which it flows through outlet 56 to the reservoir (not shown), and the liquid velocity builds. When it is desired to actuate the press, control valve 58 is thrown to the position where it blocks the application of hydraulic pressure to the underside of piston 38″ in the manner outlined above, and vents the liquid below the piston through line 59 to the reservoir (not shown). Upon actuation of valve 58, spring 61 and the absence of supporting pressure on the underside of piston 38″ close valve 34″. The inertia in the decelerating liquid is directed through bores 30″ onto the upper face of piston 14″, driving it downwardly and thus moving die 51 to, against, and through the work piece on anvil 52. Piston 14″ stops moving downwardly once it has uncovered escape ports 54, through which working fluid flows into surge chamber 55. Upon the completion of a stroke, the control valve 58 is then moved back to the position which permits application of hydraulic pressure to the underside of piston 38″ and washer 39″, and this pressure lifts the valve assembly to open valve 34″ once more. The springs on rod 18 retract the piston to the position shown in FIG. 7. The flowing liquid regains its velocity, and the unit is in condition for the commencement of another cycle.

As was the case in the embodiment of FIG. 1, spring 41″ and escape port 42″ (see FIG. 9) permit piston 38″ to lag the movement of the remainder of valve assembly 28″ downward upon valve closure.

What is claimed is:
1. A pile driver comprising:
   a liquid ram tube orientable in the direction in which the pile is to be driven;
   means for introducing liquid into said ram tube adjacent the end thereof remote from said pile;
   a piston slidably mounted in the other end of said ram tube said piston having an inner face facing into said ram tube;
   piston return means connected to said piston and to said ram tube for urging said piston into said ram tube;
   liquid diverter means in said ram tube adjacent said piston for diverting liquid moving through said tube radially outward away from the inner face of said piston;
   valve means in said ram tube for blocking said liquid diverter means when liquid flowing through said ram tube attains a selected velocity;
   means for resetting said valve means to unblocking condition;
   a pile driving tool connected to the outer end of said piston;
   said pile driver being adapted for underwater employment, said means for introducing liquid into said ram tube comprising at least one water inlet adjacent the remote end of the ram tube for admitting water from the surrounding body of water, and said liquid diverter means exhausting to said surrounding body of water;
   pump means adjacent said water inlet for forcing water through said ram tube;
   means for supporting said pile driver over a piling to be driven; and
   said pump means comprising a venturi throat formed at the inlet of said ram tube and induction nozzle means positioned in said throat.
2. A pile driver in accordance with claim 1 and further comprising a low volume, high pressure pump for feeding liquid through said nozzle.
3. A pile driver in accordance with claim 2 in which said pump is positionable at the water surface and connected by a feed line to said nozzle.
4. A pile driver in accordance with claim 1 and further comprising accumulator means connected to said ram tube and in communication therewith immediately upstream of said liquid diverter means.
5. A pile driver in accordance with claim 4 and further comprising means for applying a gas under pressure in said accumulator.
6. A pile driver in accordance with claim 5 in which said accumulator comprises a pair of aligned cylinders, one of which is substantially closed and the other of which is in communication with said ram tube, and a pair of pistons connected for movement together, working in said cylinders, said one cylinder being greater in diameter than the other.
7. A pile driver comprising:
   a liquid ram tube orientable in the direction in which the pile is to be driven;
   means for positioning said ram tube over the pile to be driven;
   means for introducing liquid into said ram tube adjacent the end thereof remote from said said pile;
   a piston slidably mounted in the other end of said ram tube said piston having an inner face facing into said ram tube;

piston return means connected to said piston and to said ram tube for urging said piston into said ram tube;

liquid diverter means in said ram tube adjacent said piston for diverting liquid moving through said tube radially outward away from the inner face of said piston;

valve means in said ram tube for blocking said liquid diverter means when liquid flowing through said ram tube attains a selected velocity;

means for resetting said valve means to unblocking condition;

and a pile driving tool connected to the outer end of said piston said tool having an outer surface adapted for gap-free contact with said pile.

8. A pile driver in accordance with claim 7 and further comprising an accumulator at the remote end of said ram tube, and an accumulator at the other end of said ram tube positioned to receive liquid from said liquid diverter means.

9. A pile driver adapted for underwater employment comprising:
a liquid ram tube orientable in the direction in which the pile is to be driven;
means for introducing liquid into said ram tube adjacent the end thereof remote from said pile;
a piston slidably mounted in the other end of said ram tube said piston having an inner face facing into said ram tube;
piston return means connected to said piston and to said ram tube for urging said piston into said ram tube;
liquid diverter means in said ram tube adjacent said piston for diverting liquid moving through said tube radially outward away from the inner face of said piston;
valve means in said ram tube for blocking said liquid diverter means when liquid flowing through said ram tube attains a selected velocity;
means for resetting said valve means to unblocking condition;
a pile driving tool connected to the outer end of said piston;
said means for introducing liquid into said ram tube comprising at least one water inlet adjacent the remote end of the ram tube for admitting water from the surrounding body of water;
said liquid diverter means exhausting to said surrounding body of water;
pump means adjacent said water inlet for forcing water through said ram tube;
and means for supporting said pile driver over a piling to be driven.

10. A pile driver in accordance with claim 9 in which said pump is an impeller pump.

11. A pile driver comprising:
a liquid ram tube orientable in the direction in which the pile is to be driven;
means for introducing liquid into said ram tube adjacent the end thereof remote from said pile;
a piston slidably mounted in the other end of said ram tube said piston having an inner face facing into said ram tube;
piston return means connected to said piston and to said ram tube for urging said piston into said ram tube;
liquid diverter means in said ram tube adjacent said piston for diverting liquid moving through said tube radially outward away from the inner face of said piston;
valve means in said ram tube for blocking said liquid diverter means when liquid flowing through said ram tube attains a selected velocity;
means for resetting said valve means to unblocking condition;
a pile driving tool connected to the outer end of said piston;
said valve resetting means comprising a hydraulic valve opening piston operatively connected to said valve means and liquid pressure conducting means extending from a point adjacent the remote end of said ram tube to a face of said piston for applying valve opening pressure thereto.

12. A tool for deriving a translational force from a body of decelerating liquid comprising:
a ram tube orientable in alignment with the desired direction of development of said force;
means for introducing liquid into one end of said ram tube for flow therethrough;
a piston slidably mounted in the other end of said ram tube;
piston return means connected to said piston and said ram tube for urging said piston into said ram tube;
liquid diverter means in said ram tube adjacent said piston for diverting liquid moving through said tube away from the inner face of said piston;
valve means in said ram tube for blocking said liquid diverter means when liquid flowing through said ram tube reaches a selected velocity to thereby decelerate it and thus force said piston outwardly of said ram tube;
and hydraulic means including a static liquid pressure conduit extending substantially from said one end of the ram tube to said valve means for normally urging said valve means toward unblocking condition.

13. A tool in accordance with claim 12 in which said selected velocity is selectable for each stroke and further comprising pressure switch means in said pressure conducting means for removing valve opening pressure from said piston face.

14. A tool in accordance with claim 12 in which said selected velocity is substantially uniform from stroke to stroke and further comprising an orifice plate in said ram tube operatively connected to said valve means for closure thereof when the pressure drop across said orifice plate reaches a value corresponding to said selected velocity.

15. A tool in accordance with claim 12 in which said valve means includes a valve exposed to the pressure of liquid in said ram tube, said valve having a seat of selected area, and said hydraulic means includes a piston exposed to the pressure in said static liquid pressure line, said piston working against said valve, and having an area exposed to static line pressure greater than the area of said valve seat.

16. A tool in accordance with claim 12 and further comprising an orifice plate positioned in said ram tube and exposed to liquid flowing therethrough, said orifice plate being operatively connected to said valve means to force said valve means to blocking position against the unblocking urging of said hydraulic means when the liquid flowing through the ram tube and past the orifice plate reaches a selected velocity.

17. A tool in accordance with claim 12 in which said hydraulic means includes liquid switch means for selectively interrupting said static liquid pressure conduit.

18. A tool in accordance with claim 12 in which said piston return means comprises a sleeve connected to the outer end of said piston and slidably engaging the exterior of said other end of the ram tube and spring means working between said ram tube and said sleeve for urging said piston into said ram tube and said sleeve onto said ram tube.

19. A punch press comprising:
an anvil having an escape bore therein for holding the work to be punched;
a ram tube mounted adjacent said anvil and aligned therewith;
a frame for holding said ram tube;
means for introducing liquid into said ram tube adjacent the end thereof remote from said anvil;
a piston slidably mounted in the other end of said ram tube;
piston return means connected to said piston and to said ram tube for urging said piston into said ram tube;
liquid diverter means in said ram tube adjacent said piston for diverting liquid moving through said tube away from the inner face of said piston;
valve means in said ram tube for blocking said liquid diverter means when liquid flowing through said ram tube attains a selected velocity;
means for resetting said valve means to unblocking condition;
and a punch mounted on the outer end of said piston and aligned with the escape bore in said anvil.

20. A punch press comprising:
an anvil having an escape bore therein for holding the work to be punched;
a ram tube mounted adjacent said anvil and aligned therewith;
a frame for holding said ram tube;
means for introducing liquid into said ram tube adjacent the end thereof remote from said anvil;
a piston slidably mounted in the other end of said ram tube;
piston return means connected to said piston and to said ram tube for urging said piston into said ram tube;
liquid diverter means in said ram tube adjacent said piston for diverting liquid moving through said tube away from the inner face of said piston;
valve means in said ram tube for blocking said liquid diverter means when liquid flowing through said ram tube attains a selected velocity;
means for resetting said valve means to unblocking condition;
a punch mounted on the outer end of said piston and aligned with the escape bore in said anvil;
and second liquid diverter means in said ram tube in the portion thereof occupied by said piston when it is in its retracted position, for limiting the outward stroke of said piston.

21. A punch press in accordance with claim 20 in which said second liquid diverter means comprises at least one transverse bore in said ram tube.

22. A punch press in accordance with claim 20 and further comprising an annular accumulator surrounding said ram tube in position to receive liquid issuing from said first and second liquid diverter means.

23. A pile driver comprising:
a liquid ram tube orientable to drive a pile generally downwardly;
means for introducing liquid into said ram tube adjacent the upper end thereof;
cylinder means connected to the lower end of said ram tube in axial alignment therewith and comprising an extension thereof;
a piston slidably mounted in said cylinder means;
a pile driving tool connected to the lower end of said piston;
and means for decelerating liquid flowing downwardly in said ram tube from time to time, to thereby apply inertia forces to the upper face of said piston for driving it downwardly in said cylinder means;
the cross sectional areas of said ram tube and said piston being substantially equal, thereby substantially eliminating reactive forces tending to lift said pile driver from the pile upon operation of said deceleration means.

24. A pile driver comprising:
a liquid ram tube orientable to drive a pile generally downwardly;
means for introducing liquid into said ram tube adjacent the upper end thereof;
cylinder means connected to the lower end of said ram tube in axial alignment therewith and comprising an extension thereof;
a piston slidably mounted in said cylinder means;
a pile driving tool connected to the lower end of said piston;
and means for decelerating liquid flowing downwardly in said ram tube from time to time, to thereby apply inertia forces to the upper face of said piston for driving it downwardly in said cylinder means;
the cross sectional area of said ram tube being smaller than the cross sectional area of said piston, and the weight of said pile driver being at least substantially equal to the weight of the liquid in said ram tube, whereby the effective ram weight of the pile driver substantially equals the sum of its weight and the weight of the liquid in the ram tube.

25. A tool for deriving a translational force from a body of decelerating liquid comprising:
a ram tube orientable in alignment with the desired direction of development of said force;
means for introducing liquid into one end of said ram tube for flow therethrough;
a piston slidably mounted in the other end of said ram tube;
piston return means connected to said piston and said ram tube for urging said piston into said ram tube;
liquid diverter means in said ram tube adjacent said piston for diverting liquid moving through said tube away from the inner face of said piston;
valve means in said ram tube for blocking said liquid diverter means when liquid flowing through said ram tube reaches a selected velocity to thereby decelerate it and thus force said piston outwardly of said ram tube;
and hydraulic means for normally urging said valve means toward unblocking condition.

26. A pile driver comprising:
a liquid ram tube orientable in the direction in which the pile is to be driven;
means for introducing liquid into said ram tube adjacent the end thereof remote from said pile;

a piston slidably mounted in the other end of said ram tube said piston having an inner face facing into said ram tube;

piston return means connected to said piston and to said ram tube for urging said piston into said ram tube;

liquid diverter means in said ram tube adjacent said piston for diverting liquid moving through said tube away from the inner face of said piston;

valve means in said ram tube for blocking said liquid diverter means when liquid flowing through said ram tube attains a selected velocity;

means for resetting said valve means to unblocking condition;

and a pile driving tool connected to the outer end of said piston;

said valve means comprising:

a valve housing;

a main bore in one end of said housing;

at least one force transmitting bore in the other end of said housing communicating with said main bore;

at least one generally transverse diverter bore in said housing communicating at its inner end with said central bore intermediate the ends thereof;

and a stem valve assembly mounted in said central bore comprising:

a stem;

a valve body carried on said stem and seatable against the bottom of said main bore;

valve closing means carried on said stem at one end thereof and reciprocable therewith in said main bore;

a valve opening piston mounted on said stem at the other end thereof, said piston being reciprocable in said central bore;

and means for delivering hydraulic pressure to the end face of said piston.

27. Apparatus in accordance with claim 26 in which said valve closing means comprises an orifice plate.

28. Apparatus in accordance with claim 27 in which said orifice plate comprises an apertured plate attached to said stem and an overlying plate floatingly mounted on said stem for floating movement toward and away from said apertured plate.

29. Apparatus in accordance with claim 26 in which said valve closing means comprises an apertured plate attached to said stem and spring means working against said apertured plate and said main bore.

30. Apparatus in accordance with claim 26 in which said valve opening piston is resiliently slidable on said stem, and further comprising hydraulic liquid escape ports extending from one face of said piston to the other and openable upon sliding of said piston toward said valve body.

31. Apparatus in accordance with claim 30 in which said hydraulic liquid escape ports comprise slots in said piston lying radially inwardly of the edge of said washer.

32. Apparatus in accordance with claim 26 in which said valve opening piston is mounted for resiliently sliding movement on said stem by means comprising a washer mounted at the end of said stem in position to prevent movement of said piston off of said stem, a shoulder on said stem, and a spring working between said shoulder and said piston and urging said piston toward said washer.

33. A tool for deriving a translational force from a body of decelerating liquid comprising:

a ram tube orientable in alignment with the desired direction of development of said force;

means for introducing liquid into one end of said ram tube for flow therethrough;

a piston slidably mounted in the other end of said ram tube;

piston return means connected to said piston and said ram tube for urging said piston into said ram tube;

liquid diverter means in said ram tube adjacent said piston for diverting liquid moving through said tube away from the inner face of said piston;

valve means in said ram tube for blocking said liquid diverter means when liquid flowing through said ram tube reaches a selected velocity to thereby decelerate it and thus force said piston outwardly of said ram tube;

hydraulic means for normally urging said valve means toward unblocking condition;

said valve means comprising:

a valve housing;

a main bore in one end of said housing;

at least one force transmitting bore in the other end of said housing communicating with said main bore;

a central bore in said housing communicating at one end thereof with said main bore;

at least one generally transverse diverter bore in said housing communicating at its inner end with said central bore intermediate the ends thereof;

and a stem valve assembly mounted in said central bore comprising:

a stem;

a valve body carried on said stem and seatable against the bottom of said main bore;

valve closing means carried on said stem at one end thereof and reciprocable therewith in said main bore;

a valve opening piston mounted on said stem at the other end thereof, said piston being reciprocable in said central bore;

and means for delivering hydraulic pressure to the end face of said piston.

34. Apparatus in accordance with claim 33 in which said valve closing means comprises an orifice plate.

35. Apparatus in accordance with claim 34 in which said orifice plate comprises an apertured plate attached to said stem and an overlying plate floatingly mounted on said stem for floating movement toward and away from said apertured plate.

36. Apparatus in accordance with claim 33 in which said valve closing means comprises an apertured plate attached to said stem and spring means working against said apertured plate and said main bore.

37. Apparatus in accordance with claim 33 in which said valve opening piston is resiliently slidable on said stem, and further comprising hydraulic liquid escape ports extending from one face of said piston to the other and openable upon sliding of said piston toward said valve body.

38. Apparatus in accordance with claim 33 in which said valve opening piston is mounted for resiliently sliding movement on said stem by means comprising a washer mounted at the end of said stem in position to prevent movement of said piston off of said stem, a shoulder on said stem, and a spring working between said shoulder and said piston and urging said piston toward said washer.

39. Apparatus in accordance with claim 38 in which said hydraulic liquid escape ports comprise slots in said piston lying radially inwardly of the edge of said washer.

* * * * *